US 9,989,125 B2

(12) United States Patent
Schoolcraft

(10) Patent No.: US 9,989,125 B2
(45) Date of Patent: Jun. 5, 2018

(54) MULTI-SPEED TRANSMISSION

(71) Applicant: ALLISON TRANSMISSION, INC., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days. days.

(21) Appl. No.: 15/003,112

(22) Filed: Jan. 21, 2016

(65) Prior Publication Data
US 2016/0138681 A1    May 19, 2016

Related U.S. Application Data

(62) Division of application No. 14/453,660, filed on Aug. 7, 2014, now abandoned.

(51) Int. Cl.
*F16H 3/66* (2006.01)
*F16H 3/64* (2006.01)

(52) U.S. Cl.
CPC .......... *F16H 3/66* (2013.01); *F16H 3/64* (2013.01); *F16H 3/666* (2013.01); *F16H 2200/0065* (2013.01); *F16H 2200/2012* (2013.01); *F16H 2200/2046* (2013.01)

(58) Field of Classification Search
CPC ..... F16H 2200/0065; F16H 2200/2012; F16H 2200/2046; F16H 3/64; F16H 3/66; F16H 3/666
See application file for complete search history.

(56) References Cited

U.S. PATENT DOCUMENTS

| 6,176,803 | B1 | 1/2001 | Meyer et al. |
| 6,910,985 | B2 | 6/2005 | Ishimaru et al. |
| 6,955,627 | B2 | 10/2005 | Thomas et al. |
| 6,984,187 | B2 | 1/2006 | Biermann |
| 7,101,305 | B2 | 9/2006 | Tabata et al. |
| 7,226,381 | B2 | 6/2007 | Klemen |
| 7,429,230 | B2 | 9/2008 | Ziemer |
| 7,549,942 | B2 | 6/2009 | Gumpoltsberger |
| 7,556,582 | B2 | 7/2009 | Gumpoltsberger |
| 7,566,283 | B2 | 7/2009 | Gumpoltsberger |
| 7,575,533 | B2 | 8/2009 | Gumpoltsberger |
| 7,651,431 | B2 | 1/2010 | Phillips et al. |
| 7,674,200 | B2 | 3/2010 | Shim |
| 7,686,730 | B2 | 3/2010 | Baldwin |

(Continued)

OTHER PUBLICATIONS

International Search Report and Written Opinion, issued by Korean Intellectual Property Office dated May 7, 2015, 10 pages.

*Primary Examiner* — Jacob S. Scott
*Assistant Examiner* — Tinh Dang
(74) *Attorney, Agent, or Firm* — Taft Stettinius & Hollister LLP; Stephen F. Rost

(57) ABSTRACT

The present disclosure provides a multiple speed transmission having an input member, an output member, a plurality of planetary gearsets, a plurality of interconnecting members and a plurality of torque-transmitting mechanisms. The plurality of planetary gear sets includes first, second and third members. The input member is continuously interconnected with at least one member of one of the plurality of planetary gear sets, and the output member is continuously interconnected with another member of one of the plurality of planetary gear sets.

20 Claims, 6 Drawing Sheets

(56) References Cited

U.S. PATENT DOCUMENTS

| | | |
|---|---|---|
| 7,691,022 B2 | 4/2010 | Phillips et al. |
| 7,691,024 B2 | 4/2010 | Phillips et al. |
| 7,695,396 B2 | 4/2010 | Phillips et al. |
| 7,704,181 B2 | 4/2010 | Phillips et al. |
| 7,722,496 B2 | 5/2010 | Phillips et al. |
| 7,727,104 B2 | 6/2010 | Shim |
| 7,731,625 B2 | 6/2010 | Phillips et al. |
| 7,736,263 B2 | 6/2010 | Phillips et al. |
| 7,753,820 B2 | 7/2010 | Phillips et al. |
| 7,771,306 B2 | 8/2010 | Phillips et al. |
| 7,828,690 B2 | 11/2010 | Wittkopp et al. |
| 7,841,960 B2 | 11/2010 | Baldwin |
| 7,846,057 B2 | 12/2010 | Shim |
| 7,846,058 B2 | 12/2010 | Kim |
| 7,850,568 B2 | 12/2010 | Shim |
| 7,850,569 B2 | 12/2010 | Seo et al. |
| 7,887,454 B2 | 2/2011 | Phillips et al. |
| 7,914,414 B2 | 3/2011 | Phillips et al. |
| 7,946,948 B2 | 5/2011 | Phillips et al. |
| 7,980,988 B2 | 7/2011 | Phillips et al. |
| 7,985,159 B2 | 7/2011 | Phillips et al. |
| 7,988,586 B2 | 8/2011 | Phillips et al. |
| 7,993,235 B2 | 8/2011 | Wittkopp et al. |
| 7,993,237 B2 | 8/2011 | Wittkopp et al. |
| 7,993,238 B2 | 8/2011 | Phillips et al. |
| 7,998,013 B2 | 8/2011 | Phillips et al. |
| 8,007,394 B2 | 8/2011 | Phillips et al. |
| 8,007,395 B2 | 8/2011 | Wittkopp et al. |
| 8,007,398 B2 | 8/2011 | Phillips et al. |
| 8,016,713 B2 | 9/2011 | Phillips et al. |
| 8,033,948 B2 | 10/2011 | Phillips et al. |
| 8,038,565 B2 | 10/2011 | Phillips et al. |
| 8,038,568 B2 | 10/2011 | Hobson et al. |
| 8,043,189 B2 | 10/2011 | Phillips et al. |
| 8,043,192 B2 | 10/2011 | Phillips et al. |
| 8,047,950 B2 | 11/2011 | Wittkopp et al. |
| 8,047,951 B2 | 11/2011 | Wittkopp et al. |
| 8,047,954 B2 | 11/2011 | Phillips et al. |
| 8,052,566 B2 | 11/2011 | Wittkopp et al. |
| 8,052,567 B2 | 11/2011 | Hart et al. |
| 8,057,349 B2 | 11/2011 | Phillips et al. |
| 8,070,646 B2 | 12/2011 | Hart et al. |
| 8,079,932 B2 | 12/2011 | Phillips et al. |
| 8,088,032 B2 | 1/2012 | Gumpoltsberger et al. |
| 8,096,915 B2 | 1/2012 | Wittkopp et al. |
| 8,100,808 B2 | 1/2012 | Wittkopp et al. |
| 8,105,198 B2 | 1/2012 | Hart et al. |
| 8,128,527 B2 | 3/2012 | Hart et al. |
| 8,142,324 B2 | 3/2012 | Phillips et al. |
| 8,142,325 B2 | 3/2012 | Phillips et al. |
| 8,152,681 B2 | 4/2012 | Seo et al. |
| 8,157,697 B2 | 4/2012 | Hart et al. |
| 8,167,765 B2 | 5/2012 | Phillips et al. |
| 8,167,766 B2 | 5/2012 | Phillips et al. |
| 8,187,137 B2 | 5/2012 | Carey et al. |
| 8,197,376 B2 | 6/2012 | Gumpoltsberger et al. |
| 8,202,190 B2 | 6/2012 | Phillips et al. |
| 8,206,257 B2 | 6/2012 | Gumpoltsberger et al. |
| 8,210,981 B2 | 7/2012 | Bauknecht et al. |
| 8,210,982 B2 | 7/2012 | Gumpoltsberger et al. |
| 8,210,983 B2 | 7/2012 | Gumpoltsberger et al. |
| 8,231,495 B2 | 7/2012 | Gumpoltsberger et al. |
| 8,231,496 B2 | 7/2012 | Gumpoltsberger et al. |
| 8,231,501 B2 | 7/2012 | Gumpoltsberger et al. |
| 8,241,170 B2 | 8/2012 | Gumpoltsberger et al. |
| 8,241,171 B2 | 8/2012 | Gumpoltsberger et al. |
| 8,246,504 B2 | 8/2012 | Gumpoltsberger et al. |
| 8,251,856 B2 | 8/2012 | Phillips et al. |
| 8,251,857 B1 | 8/2012 | Mellet et al. |
| 8,251,859 B2 | 8/2012 | Gumpoltsberger et al. |
| 8,277,355 B2 | 10/2012 | Hart et al. |
| 8,287,420 B2 | 10/2012 | Gumpoltsberger et al. |
| 8,303,453 B2 | 11/2012 | Wittkopp et al. |
| 8,303,455 B2 | 11/2012 | Gumpoltsberger et al. |
| 8,328,678 B2 | 12/2012 | Seo et al. |
| 8,333,676 B2 | 12/2012 | Kim |
| 8,343,005 B2 | 1/2013 | Hart et al. |
| 8,366,580 B2 | 2/2013 | Wittkopp et al. |
| 8,376,893 B2 | 2/2013 | Wittkopp et al. |
| 8,376,895 B2 | 2/2013 | Saitoh et al. |
| 8,382,634 B2 | 2/2013 | Beck et al. |
| 8,398,522 B2 | 3/2013 | Bauknecht et al. |
| 8,403,802 B2 * | 3/2013 | Wittkopp .............. F16H 3/66 475/276 |
| 8,403,803 B2 | 3/2013 | Gumpoltsberger et al. |
| 8,409,047 B2 | 4/2013 | Borgerson et al. |
| 8,414,445 B2 | 4/2013 | Carey et al. |
| 8,414,446 B2 | 4/2013 | Beck et al. |
| 8,419,587 B2 | 4/2013 | Gumpoltsberger et al. |
| 8,425,367 B2 | 4/2013 | Christensen et al. |
| 8,425,368 B2 | 4/2013 | Phillips et al. |
| 8,425,369 B2 | 4/2013 | Wittkopp et al. |
| 8,425,370 B2 * | 4/2013 | Leesch .................. F16H 3/66 475/271 |
| 8,430,784 B2 | 4/2013 | Hart et al. |
| 8,430,785 B2 | 4/2013 | Beck et al. |
| 8,435,153 B2 | 5/2013 | Phillips et al. |
| 8,444,524 B2 | 5/2013 | Gumpoltsberger et al. |
| 8,444,525 B2 | 5/2013 | Lee |
| 8,465,390 B2 | 6/2013 | Brehmer et al. |
| 8,480,533 B2 | 7/2013 | Meyer et al. |
| 8,485,934 B2 | 7/2013 | Gumpoltsberger et al. |
| 8,496,558 B2 | 7/2013 | Wittkopp et al. |
| 8,506,442 B2 | 8/2013 | Mellet et al. |
| 8,512,196 B2 | 8/2013 | Mellet et al. |
| 8,523,729 B2 | 9/2013 | Hart et al. |
| 8,529,394 B2 | 9/2013 | Gumpoltsberger et al. |
| 8,529,395 B2 | 9/2013 | Wittkopp et al. |
| 8,529,396 B1 | 9/2013 | Vernon et al. |
| 8,545,362 B1 | 10/2013 | Goleski et al. |
| 8,556,766 B2 | 10/2013 | Mellet et al. |
| 8,556,768 B2 | 10/2013 | Park et al. |
| 8,574,113 B1 | 11/2013 | Goleski |
| 8,574,114 B2 | 11/2013 | Brehmer et al. |
| 8,591,364 B2 | 11/2013 | Hart |
| 8,591,377 B1 | 11/2013 | Hoffman et al. |
| 8,597,152 B2 | 12/2013 | Seo et al. |
| 8,597,153 B2 | 12/2013 | Saitoh et al. |
| 8,608,612 B2 | 12/2013 | Park et al. |
| 8,617,022 B1 | 12/2013 | Vernon et al. |
| 8,636,617 B2 | 1/2014 | Singh |
| 8,636,618 B2 | 1/2014 | Hart et al. |
| 8,647,227 B2 | 2/2014 | Park et al. |
| 8,657,717 B2 * | 2/2014 | Gumpoltsberger ....... F16H 3/66 475/280 |
| 8,663,053 B2 | 3/2014 | Beck et al. |
| 8,663,056 B2 | 3/2014 | Gumpoltsberger et al. |
| 8,678,972 B2 | 3/2014 | Wittkopp et al. |
| 8,702,554 B2 | 4/2014 | Gumpoltsberger et al. |
| 8,708,862 B2 | 4/2014 | Scherer et al. |
| 8,721,488 B2 | 5/2014 | Mellet et al. |
| 8,721,492 B2 | 5/2014 | Fellmann et al. |
| 8,727,929 B2 | 5/2014 | Beck et al. |
| 8,734,286 B2 | 5/2014 | Poon |
| 8,758,187 B2 | 6/2014 | Mellet et al. |
| 8,758,189 B2 | 6/2014 | Hart et al. |
| 8,777,797 B2 | 7/2014 | Mellet et al. |
| 8,777,798 B2 | 7/2014 | Borgerson et al. |
| 8,801,563 B2 | 8/2014 | Ohnemus et al. |
| 8,801,565 B2 | 8/2014 | Hart et al. |
| 8,821,336 B2 | 9/2014 | Wilton et al. |
| 8,856,387 B2 | 10/2014 | Haupt et al. |
| 8,864,618 B1 | 10/2014 | Noh et al. |
| 8,688,648 B2 | 11/2014 | Mellet et al. |
| 8,894,535 B2 | 11/2014 | Mellet et al. |
| 8,915,819 B2 | 12/2014 | Coffey et al. |
| 8,920,281 B2 | 12/2014 | Mellet et al. |
| 8,939,863 B2 | 1/2015 | Hart et al. |
| 8,951,160 B2 | 2/2015 | Vernon et al. |
| 8,961,355 B2 | 2/2015 | Hart et al. |
| 8,961,356 B2 | 2/2015 | Bockenstette et al. |
| 8,968,142 B2 | 3/2015 | Lippert |
| 8,968,144 B2 | 3/2015 | Janson et al. |
| 9,624,985 B2 * | 4/2017 | Chrisofakis ............... F16H 3/66 |

(56) References Cited

U.S. PATENT DOCUMENTS

| | | |
|---|---|---|
| 2006/0205656 A1 | 9/2006 | Klemen |
| 2006/0223666 A1 | 10/2006 | Gumpoltsberger |
| 2007/0207891 A1 | 9/2007 | Gumpoltsberger |
| 2007/0213168 A1 | 9/2007 | Gumpoltsberger |
| 2008/0070740 A1 | 3/2008 | Gumpoltsberger |
| 2008/0125269 A1 | 5/2008 | Gumpoltsberger |
| 2008/0227586 A1 | 9/2008 | Raghavan |
| 2008/0300092 A1 | 12/2008 | Phillips et al. |
| 2009/0011891 A1 | 1/2009 | Phillips et al. |
| 2009/0017964 A1 | 1/2009 | Phillips et al. |
| 2009/0017965 A1 | 1/2009 | Phillips et al. |
| 2009/0017966 A1 | 1/2009 | Phillips et al. |
| 2009/0017971 A1 | 1/2009 | Phillips et al. |
| 2009/0017976 A1 | 1/2009 | Phillips et al. |
| 2009/0017977 A1 | 1/2009 | Phillips et al. |
| 2009/0017979 A1 | 1/2009 | Phillips et al. |
| 2009/0017980 A1 | 1/2009 | Phillips et al. |
| 2009/0036253 A1 | 2/2009 | Phillips et al. |
| 2009/0048059 A1 | 2/2009 | Phillips et al. |
| 2009/0048062 A1 | 2/2009 | Seo et al. |
| 2009/0054196 A1 | 2/2009 | Phillips et al. |
| 2009/0118059 A1 | 5/2009 | Phillips et al. |
| 2009/0118062 A1 | 5/2009 | Phillips et al. |
| 2009/0124448 A1 | 5/2009 | Wittkopp et al. |
| 2009/0192009 A1 | 7/2009 | Phillips et al. |
| 2009/0192010 A1 | 7/2009 | Wittkopp et al. |
| 2009/0197734 A1 | 8/2009 | Phillips et al. |
| 2009/0209387 A1 | 8/2009 | Phillips et al. |
| 2009/0209389 A1 | 8/2009 | Phillips et al. |
| 2009/0215580 A1 | 8/2009 | Hart et al. |
| 2009/0280947 A1 | 11/2009 | Seo et al. |
| 2010/0041508 A1 | 2/2010 | Gumpoltsberger et al. |
| 2010/0041509 A1 | 2/2010 | Gumpoltsberger et al. |
| 2010/0069195 A1 | 3/2010 | Baldwin |
| 2010/0190600 A1 | 7/2010 | Phillips et al. |
| 2010/0210392 A1 | 8/2010 | Hart et al. |
| 2010/0210393 A1 | 8/2010 | Phillips et al. |
| 2010/0210394 A1 | 8/2010 | Phillips et al. |
| 2010/0210395 A1 | 8/2010 | Phillips et al. |
| 2010/0210396 A1 | 8/2010 | Wittkopp et al. |
| 2010/0210398 A1 | 8/2010 | Hart et al. |
| 2010/0210400 A1 | 8/2010 | Phillips et al. |
| 2010/0210401 A1 | 8/2010 | Phillips et al. |
| 2010/0210402 A1 | 8/2010 | Phillips et al. |
| 2010/0210403 A1 | 8/2010 | Wittkopp et al. |
| 2010/0210404 A1 | 8/2010 | Phillips et al. |
| 2010/0210405 A1 | 8/2010 | Phillips et al. |
| 2010/0210406 A1 | 8/2010 | Phillips et al. |
| 2010/0216589 A1 | 8/2010 | Hart et al. |
| 2010/0216590 A1 | 8/2010 | Phillips et al. |
| 2010/0216591 A1 | 8/2010 | Wittkopp et al. |
| 2010/0227729 A1 | 9/2010 | Wittkopp et al. |
| 2010/0279814 A1 | 11/2010 | Brehmer et al. |
| 2010/0331136 A1 | 12/2010 | Jang et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0124462 A1 | 5/2011 | Meyer et al. |
| 2011/0136615 A1 | 6/2011 | Phillips et al. |
| 2011/0183807 A1 | 7/2011 | Gumpoltsberger et al. |
| 2011/0212806 A1 | 9/2011 | Phillips |
| 2011/0245013 A1 | 10/2011 | Kim |
| 2011/0245026 A1 | 10/2011 | Phillips et al. |
| 2011/0251014 A1 | 10/2011 | Leesch et al. |
| 2011/0269596 A1 | 11/2011 | Hart et al. |
| 2011/0275472 A1 | 11/2011 | Phillips et al. |
| 2011/0294617 A1 | 12/2011 | Seo et al. |
| 2012/0004066 A1 | 1/2012 | Seo et al. |
| 2012/0053004 A1 | 3/2012 | Beck et al. |
| 2012/0053005 A1 | 3/2012 | Beck et al. |
| 2012/0053008 A1 | 3/2012 | Beck et al. |
| 2012/0058856 A1 | 3/2012 | Phillips et al. |
| 2012/0065019 A1 | 3/2012 | Hart et al. |
| 2012/0108382 A1 | 5/2012 | Saitoh et al. |
| 2012/0108383 A1 | 5/2012 | Saitoh et al. |
| 2012/0115671 A1 | 5/2012 | Gumpoltsberger et al. |
| 2012/0115672 A1 | 5/2012 | Gumpoltsberger et al. |
| 2012/0122626 A1 | 5/2012 | Gumpoltsberger et al. |
| 2012/0122627 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0149525 A1 | 6/2012 | Gumpoltsberger et al. |
| 2012/0149526 A1 | 6/2012 | Gumpoltsberger et al. |
| 2012/0149527 A1 | 6/2012 | Gumpoltsberger et al. |
| 2012/0172172 A1 | 7/2012 | Gumpoltsberger et al. |
| 2012/0178572 A1 | 7/2012 | Hart |
| 2012/0178579 A1 | 7/2012 | Hart et al. |
| 2012/0178580 A1 | 7/2012 | Wittkopp et al. |
| 2012/0178581 A1 | 7/2012 | Wittkopp et al. |
| 2012/0178582 A1 | 7/2012 | Wittkopp et al. |
| 2012/0196718 A1 | 8/2012 | Hart et al. |
| 2012/0214632 A1 | 8/2012 | Mellet et al. |
| 2012/0214633 A1 | 8/2012 | Mellet et al. |
| 2012/0214636 A1 | 8/2012 | Hart et al. |
| 2012/0214637 A1 | 8/2012 | Hart et al. |
| 2012/0214638 A1 | 8/2012 | Hart et al. |
| 2012/0231917 A1 | 9/2012 | Phillips et al. |
| 2012/0231920 A1 | 9/2012 | Wittkopp et al. |
| 2012/0295754 A1 | 11/2012 | Hart et al. |
| 2012/0329600 A1 | 12/2012 | Park et al. |
| 2013/0029799 A1 | 1/2013 | Park et al. |
| 2013/0040776 A1 | 2/2013 | Mellet et al. |
| 2013/0085033 A1 | 4/2013 | Wittkopp et al. |
| 2013/0150203 A1 | 6/2013 | Park et al. |
| 2013/0150204 A1 | 6/2013 | Park et al. |
| 2013/0203549 A1 | 8/2013 | Mellet et al. |
| 2013/0237365 A1 | 9/2013 | Coffey et al. |
| 2013/0252780 A1 | 9/2013 | Ohnemus et al. |
| 2013/0310211 A1 | 11/2013 | Wilton et al. |

* cited by examiner

| Gear State | Gear Ratio | Torque Transmitting Mechanisms ||||||
|---|---|---|---|---|---|---|---|
| | | C1 | C2 | C3 | C4 | C5 | C6 |
| Rev | -4.93 | X | X | | | X | |
| 1st | 5.51 | | X | | | X | |
| 2nd | 3.33 | | | X | X | X | |
| 3rd | 2.31 | | X | X | X | X | |
| 4th | 1.66 | | X | | | X | X |
| 5th | 1.21 | | X | X | | | X |
| 6th | 1.00 | | | X | X | | X |
| 7th | 0.86 | | X | | X | | X |
| 8th | 0.71 | X | | | X | | X |
| 9th | 0.60 | X | X | | | | X |

Fig. 6

MULTI-SPEED TRANSMISSION

FIELD OF THE DISCLOSURE

The present disclosure relates to a multiple speed transmission, and in particular to a multiple speed transmission capable of achieving nine or more speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In one embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the second member of the first planetary gearset with a stationary member; a second torque-transmitting mechanism selectively engageable to interconnect the first member of the second planetary gearset with the stationary member; a third torque-transmitting mechanism selectively engageable to interconnect the second member of the third planetary gearset with the stationary member; a fourth torque-transmitting mechanism selectively engageable to interconnect the second member of the first planetary gearset with the first member of the first planetary gearset and the input member; a fifth torque-transmitting mechanism selectively engageable to interconnect the second member of the first planetary gearset with the third member of the second planetary gearset, the first member of the third planetary gearset, and the first member of the fourth planetary gearset; and a sixth torque-transmitting mechanism selectively engageable to interconnect the third member of the fourth planetary gearset with the third member of the third planetary gearset and the output member; wherein the torque transmitting mechanisms are selectively engageable to establish nine forward speed ratios and one reverse speed ratio between the input member and the output member.

In one example of this embodiment, one of the first, second, third and fourth planetary gearsets comprises an idler planet planetary gearset. In a second example, the third planetary gearset comprises the idler planet planetary gearset. In a third example, the third member of the third planetary gearset is continuously interconnected with the output member. In a fourth example, the input member is continuously interconnected with the first member of the first planetary gearset and the second member of the fourth planetary gearset.

In a fifth example, the plurality of interconnecting members includes a first interconnecting member continuously interconnecting the third member of the first planetary gearset with the second member of the second planetary gearset. In a sixth example, the plurality of interconnecting members includes a second interconnecting member continuously interconnecting the third member of the second planetary gearset with the first member of the third planetary gearset and the first member of the fourth planetary gearset. In a seventh example, the first, second, and third members of the first, second, third, and fourth planetary gearsets are each at least one of a sun gear, a ring gear, and a carrier member.

In another embodiment of this disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the second member of the first planetary gearset with a stationary member; a second torque-transmitting mechanism selectively engageable to interconnect the first member of the second planetary gearset with the stationary member; a third torque-transmitting mechanism selectively engageable to interconnect the third member of the third planetary gearset with the stationary member; a fourth torque-transmitting mechanism selectively engageable to interconnect the second member of the first planetary gearset with the first member of the first planetary gearset and the input member; a fifth torque-transmitting mechanism selectively engageable to interconnect the second member of the first planetary gearset with the third member of the second planetary gearset, the first member of the third planetary gearset, and the first member of the fourth planetary gearset; and a sixth torque-transmitting mechanism selectively engageable to interconnect the second member of the fourth planetary gearset with the second member of the third planetary gearset and the output member; wherein the torque transmitting mechanisms are selectively engageable in combinations of three to establish nine forward speed ratios and one reverse speed ratio between the input member and the output member.

In one example of this embodiment, the fourth planetary gearset includes an idler planet planetary gearset. In a second example, the input member is continuously interconnected with the first member of the first planetary gearset and the third member of the fourth planetary gearset. In a third example, the plurality of interconnecting members includes a first interconnecting member continuously interconnecting the third member of the first planetary gearset with the second member of the second planetary gearset. In a fourth example, the plurality of interconnecting members includes a second interconnecting member continuously interconnecting the third member of the second planetary gearset with the first member of the third planetary gearset and the first member of the fourth planetary gearset. In a fifth example, the first, second, and third members of the first, second, third, and fourth planetary gearsets are each at least one of a sun gear, a ring gear, and a carrier member.

In a different embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the second member of the first planetary gearset with a stationary member; a second torque-transmitting mechanism selectively engageable to interconnect the first member or second member of the second planetary gearset with the stationary member; a third torque-transmitting mechanism selectively engageable to interconnect the third member of the third planetary gearset with the stationary member; a fourth torque-transmitting mechanism selectively engageable to interconnect the second member of the first planetary gearset with the first member of the first planetary gearset and the input member; a fifth torque-transmitting mechanism selectively engageable to interconnect the second member of the first planetary gearset with the first member of the third planetary gearset, the first member of the fourth planetary gearset, and the first member or second member of the second planetary gearset; and a sixth torque-transmitting mechanism selectively engageable to interconnect the second member of the fourth planetary gearset with the second member of the third planetary gearset and the output member; wherein the torque transmitting mechanisms are selectively engageable in combinations of three to establish nine forward speed ratios and one reverse speed ratio between the input member and the output member.

In one example of this embodiment, the second planetary gearset comprises the idler planet planetary gearset. In a second example, the input member is continuously interconnected with the first member of the first planetary gearset and the third member of the fourth planetary gearset; and the output member is continuously interconnected with the second member of the third planetary gearset. In a third example, the plurality of interconnecting members includes a first interconnecting member continuously interconnecting the third member of the first planetary gearset with the third member of the second planetary gearset. In a fourth example, the plurality of interconnecting members includes a second interconnecting member continuously interconnecting the second member of the second planetary gearset with the first member of the third planetary gearset and the first member of the fourth planetary gearset. In a fifth example, the plurality of interconnecting members includes a second interconnecting member continuously interconnecting the first member of the second planetary gearset with the first member of the third planetary gearset and the first member of the fourth planetary gearset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 6 is a truth table presenting an example of a state of engagement of various torque transmitting mechanisms in each of the available forward and reverse speeds or gear ratios of the transmission illustrated in FIGS. 2-5.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
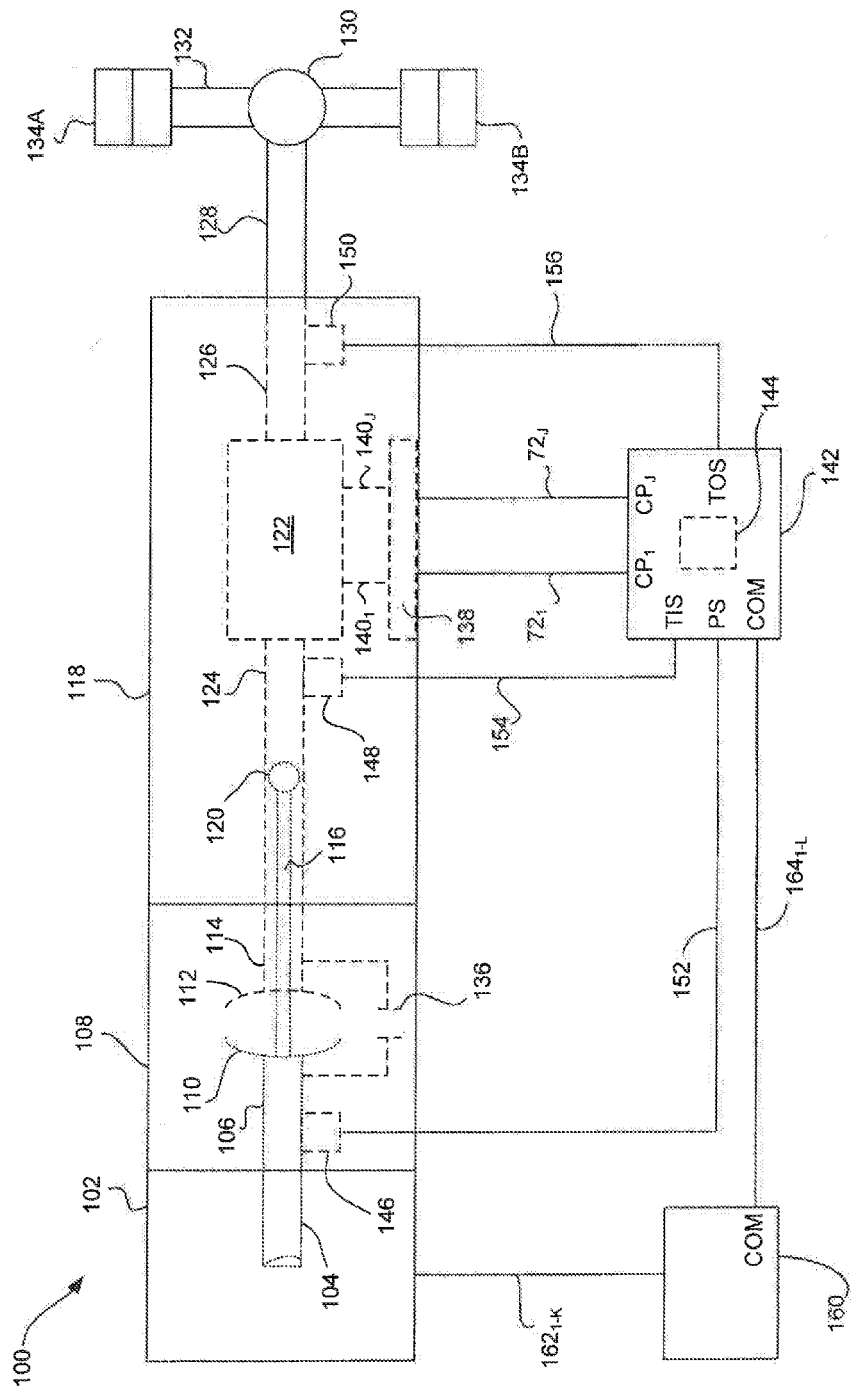
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
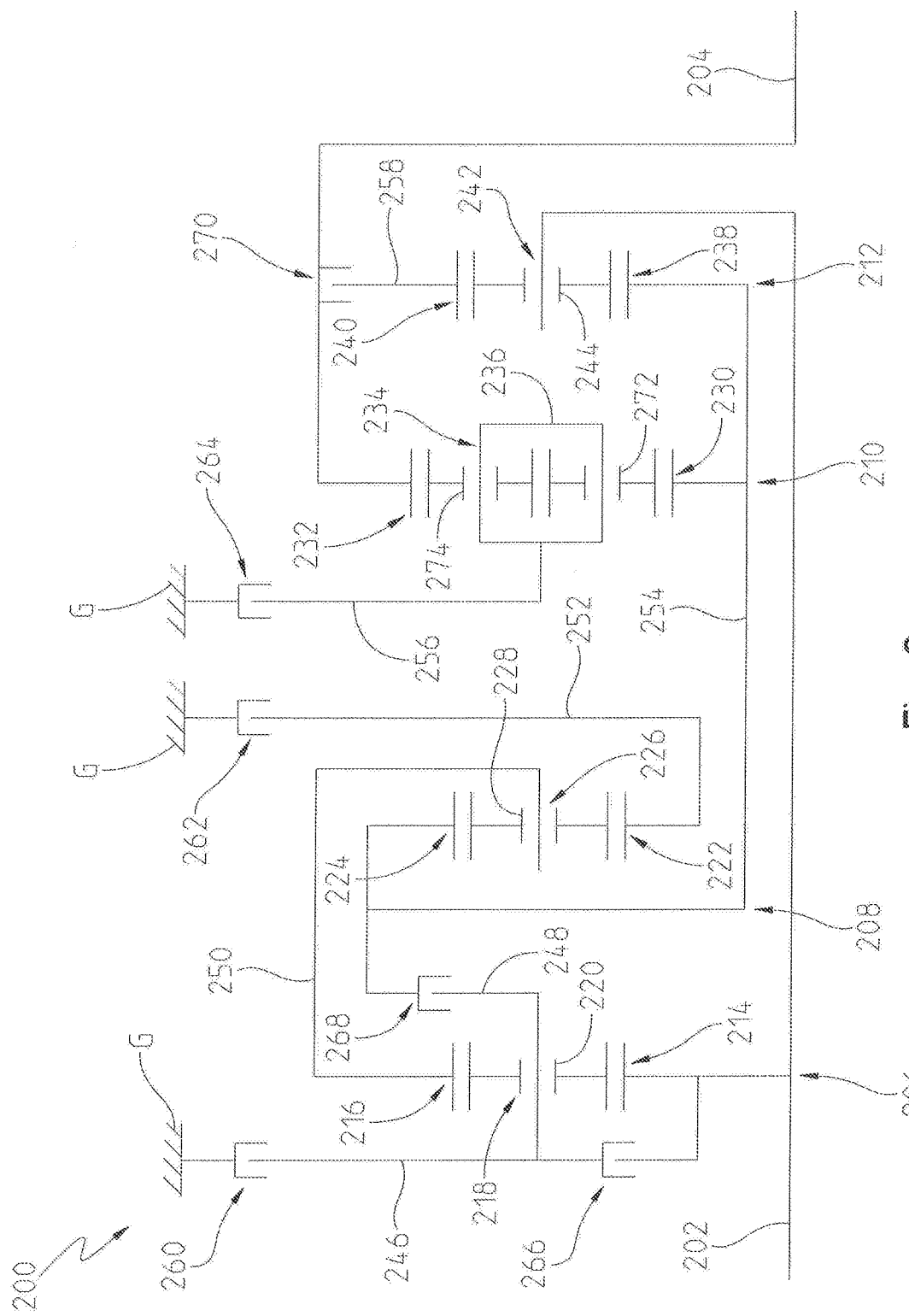
FIG. 2 is a diagrammatic view of one embodiment of a multiple speed transmission.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspect can be appreciated by one skilled in the art.

The transmission 200 can also include a plurality of planetary gearsets. In the illustrated embodiment of FIG. 2, the transmission 200 includes a first planetary gearset 206, a second planetary gearset 208, a third planetary gearset 210, and a fourth planetary gearset 212. In this embodiment, the first planetary gearset 206, the second planetary gearset 208, and the fourth planetary gearset 212 can be referred to as a simple or compound planetary gearset. On the other hand, the third planetary gearset 210 can be referred to as an idler planet planetary gearset. In one example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 200, but in FIG. 2, the planetary gearsets are aligned in an axial direction consecutively in sequence (i.e., first, second, third, and fourth between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 260, a second torque-transmitting mechanism 262, and a third torque-transmitting mechanism 264 that are configured to function as brakes (e.g., each torque-transmitting mechanism is fixedly coupled to the outer housing of the transmission 200). These brakes can be configured as shiftable-friction-locked disk brakes, shiftable friction-locked band brakes, shiftable form-locking claw or conical brakes, or any other type of known brake. The transmission 200 can include a fourth torque-transmitting mechanism 266, a fifth torque-transmitting mechanism 268, and a sixth torque-transmitting mechanism 270 that are configured to function as rotating clutches. These can be shiftable friction-locked multi-disk clutches, shiftable form-locking claw or conical clutches, wet clutches, or any other known form of a clutch. With these six torque-transmitting mechanisms, selective shifting of nine forward gears and one reverse gear is possible.

The transmission 200 of FIG. 2 may also include up to nine different shafts, which is inclusive of the input shaft 202 and output shaft 204. Each of these shafts, designated as a first shaft 246, a second shaft 248, a third shaft 250, a fourth shaft 252, a fifth shaft 254, a sixth shaft 256, and a seventh shaft 258 are configured to be connected to one or more of the plurality of planetary gearsets or plurality of torque-transmitting mechanism between the input shaft 202 and output shaft 204.

In FIG. 2, the first planetary gearset 206 can include a first sun gear 214, a first ring gear 216, and a first carrier member 218 that rotatably supports a set of pinion gears 220. The second planetary gearset 208 can include a second sun gear 222, a second ring gear 224, and a second carrier member 226 that rotatably supports a set of pinion gears 228. The third planetary gearset 210, i.e., the idler planet planetary gearset, can include a third sun gear 230, a third ring gear 232, and a third carrier member 234 that rotatably supports two sets of pinion gears 236. One set of pinion gears 272 is rotationally coupled to the sun gear 230 and the other set of pinion gears 274 is rotationally coupled to the ring gear 232. The fourth planetary gearset 212 can include a fourth sun gear 238, a fourth ring gear 240, and a fourth carrier member 242 that rotatably supports a set of pinion gears 244.

The transmission 200 is capable of transferring torque from the input shaft 202 to the output shaft 204 in nine forward gears or ratios and one reverse gear or ratio. Each of the forward torque ratios and the reverse torque ratios can be attained by the selective engagement of one or more of the torque-transmitting mechanisms (i.e., torque-transmitting mechanisms 260, 262, 264, 266, 268, and 270). Those skilled in the art will readily understand that a different speed ratio is associated with each torque ratio. Thus, nine forward speed ratios and one reverse speed ratio may be attained by transmission 200. An example of the gear ratios that may be obtained using the embodiments of the present disclosure are also shown in FIG. 6. Of course, other gear ratios are achievable depending on the gear diameter, gear tooth count and gear configuration selected.

As for the transmission 200, kinematic coupling of the first planetary gearset 206 is shown in FIG. 2. The first sun gear 214 is coupled to the input shaft 202 for common rotation therewith. The first ring gear 216 is coupled to the third shaft 250 for common rotation therewith. First pinion gears 220 are configured to intermesh with the first sun gear 214 and first ring gear 216. First carrier member 218 is coupled for common rotation with the first shaft 246 and the second shaft 248.

With respect to the second planetary gearset 208, the second sun gear 222 is coupled to the fourth shaft 252 for common rotation therewith. The second ring gear 224 is coupled to the fifth shaft 254 for common rotation therewith. Second pinion gears 228 are configured to intermesh with the second sun gear 222 and second ring gear 224, and the second carrier member 226 is coupled for common rotation with the third shaft 250 and the first ring gear 216.

The third sun gear 230 of the third planetary gearset 210 is coupled to the fifth shaft 254 as well, and thus is disposed in common rotation with the second ring gear 224. The third ring gear 232 is coupled to the output shaft 204 for common rotation therewith. Third pinion gears 236, which include the first set of pinion gears 272 and the second set of pinion gears 274, are configured to intermesh with the third sun gear 238 and third ring gear 240, respectively. The third carrier member 234 is coupled for common rotation with the sixth shaft 256.

The kinematic relationship of the fourth planetary gearset 212 is such that the fourth sun gear 238 is coupled to the fifth shaft 254 for common rotation therewith, and thus is disposed in common rotation with the third sun gear 230 and the second ring gear 224. The fourth ring gear 240 is coupled to the seventh shaft 258 for common rotation therewith. The fourth pinions 244 are configured to intermesh with the fourth sun gear 238 and the fourth ring gear 240. The fourth carrier member 242 is coupled to the input shaft 202 for common rotation therewith, and thus is disposed in common rotation with the first sun gear 214.

With regards to the kinematic coupling of the six torque-transmitting mechanisms to the previously described shafts, the multiple speed transmission 200 of FIG. 2 provides that the first torque-transmitting mechanism 260 is arranged within the power flow between the first shaft 246 and the housing G of the transmission 200. In this manner, the first torque-transmitting mechanism 260 is configured to act as a brake. Similarly, the second torque-transmitting mechanism 262 is arranged within the power flow between the fourth shaft 252 and the housing G of the transmission 200. Thus, similar to the first torque-transmitting mechanism 260, the second torque-transmitting mechanism 262 is configured to act as a brake. The third torque-transmitting mechanism 264 is arranged within the power flow between the sixth shaft 256 and the housing G of the transmission. Thus, in this embodiment of the transmission 200 three of the six torque-transmitting mechanism are configured to act as brakes and the other three torque-transmitting mechanisms are configured to act as clutches.

The fourth torque-transmitting mechanism 266 is arranged within the power flow between the input shaft 202 and the first shaft 246. The fifth torque-transmitting mechanism 268 is arranged within the power flow between the second shaft 248 and the fifth shaft 254. Moreover, the sixth torque-transmitting mechanism 270 is arranged within the power flow between the seventh shaft 258 and the output shaft 204.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 260 is selectively engageable to couple the first carrier 218 and the first shaft 246 to the housing G of the transmission 200. The second torque-transmitting mechanism 262 is selectively engageable to couple the second sun gear 222 and the fourth shaft 252 to the housing G of the transmission 200. Moreover, the third torque-transmitting mechanism 264 is selectively engageable to couple the third carrier member 234 and the sixth shaft 256 to the housing G of the transmission 200.

The fourth torque-transmitting mechanism 266 is selectively engageable to couple the input shaft 202 to the first shaft 246 and first carrier member 218. The fifth torque-transmitting mechanism 268 is selectively engageable to couple the first carrier member 218 and the second shaft 248 to the second ring gear 224, third sun gear 230, fourth sun gear 238, and the fifth shaft 248. Lastly, the sixth torque-transmitting mechanism 270 is selectively engageable to couple the fourth ring gear 240 and the seventh shaft 258 to the third ring gear 232 and the output shaft 204.

Figure 3:
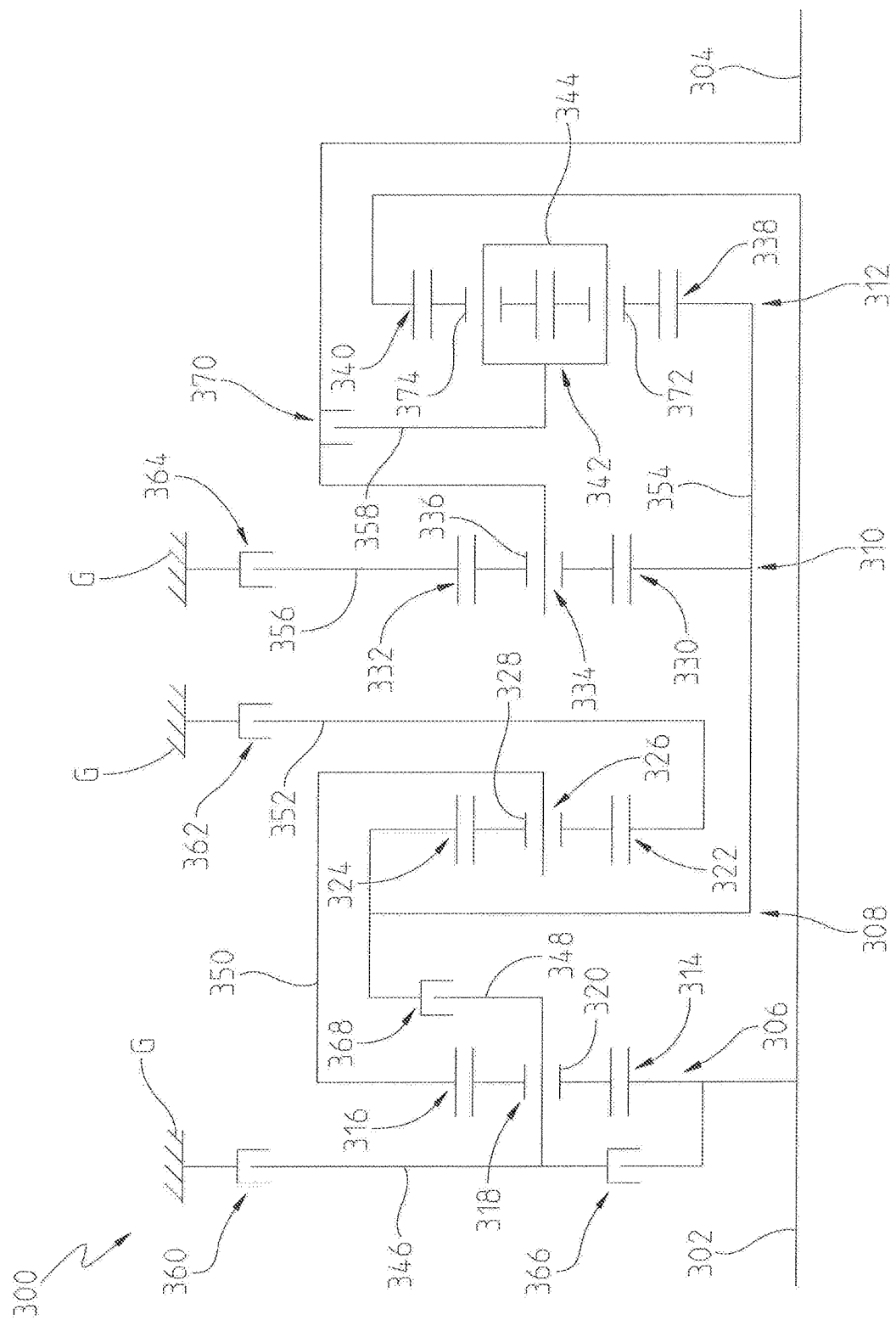
FIG. 3 is a diagrammatic view of a second embodiment of a multiple speed transmission.

Referring to FIG. 3, a different embodiment of a multiple speed transmission 300 is shown. The transmission 300 includes an input shaft 302 and an output shaft 304. The input shaft 302 and output shaft 304 can be disposed along the same axis or centerline of the transmission 300. In another aspect, the different shafts can be disposed along different axes or centerlines. In a further aspect, the different shafts can be disposed parallel to one another, but along different axes or centerlines. Other aspect can be appreciated by one skilled in the art.

The transmission 300 can also include a plurality of planetary gearsets. In the illustrated embodiment of FIG. 3, the transmission 300 includes a first planetary gearset 306, a second planetary gearset 308, a third planetary gearset 310, and a fourth planetary gearset 312. The first planetary gearset 306, the second planetary gearset 308, and the third planetary gearset 310 can be referred to as a simple or compound planetary gearset. The fourth planetary gearset 312, however, is an idler planet planetary gearset similar to that shown in FIG. 2. One or more of the plurality of planetary gearsets can be arranged in different locations within the transmission 300, but for sake of simplicity and in this particular example only, the planetary gearsets are aligned in an axial direction consecutively in sequence (i.e., first, second, third, and fourth between the input and output shafts).

The transmission 300 may also include a plurality of torque-transmitting or gearshifting mechanisms. For example, one or more of these mechanisms can include a clutch or brake. In one aspect, each of the plurality of mechanisms is disposed within an outer housing of the transmission 300. In another aspect, however, one or more of the mechanisms may be disposed outside of the housing. Each of the plurality of mechanisms can be coupled to one or more of the plurality of planetary gearsets, which will be described further below.

In the embodiment of FIG. 3, the transmission 300 can include a first torque-transmitting mechanism 360, a second torque-transmitting mechanism 362, and a third torque-transmitting mechanism 364 that are configured to function as brakes (e.g., each torque-transmitting mechanism is fixedly coupled to the outer housing of the transmission 300). These brakes can be configured as shiftable-friction-locked disk brakes, shiftable friction-locked band brakes, shiftable form-locking claw or conical brakes, or any other type of known brake. The transmission 300 can include a fourth torque-transmitting mechanism 366, a fifth torque-transmitting mechanism 368, and a sixth torque-transmitting mechanism 370 that are configured to function as rotating clutches. These can be shiftable friction-locked multi-disk clutches, shiftable form-locking claw or conical clutches, wet clutches, or any other known form of a clutch. With these six torque-transmitting mechanisms, selective shifting of nine forward gears and one reverse gear is possible.

The transmission 300 of FIG. 3 may also include up to nine different shafts, which is inclusive of the input shaft 302 and output shaft 304. Each of these shafts, designated as a first shaft 346, a second shaft 348, a third shaft 350, a fourth shaft 352, a fifth shaft 354, a sixth shaft 356, and a seventh shaft 358 are configured to be connected to one or more of the plurality of planetary gearsets or plurality of torque-transmitting mechanism between the input shaft 302 and output shaft 304.

In FIG. 3, the first planetary gearset 306 can include a first sun gear 314, a first ring gear 316, and a first carrier member 318 that rotatably supports a set of pinion gears 320. The second planetary gearset 308 can include a second sun gear 322, a second ring gear 324, and a second carrier member 326 that rotatably supports a set of pinion gears 328. The third planetary gearset 310 can include a third sun gear 330, a third ring gear 332, and a third carrier member 334 that rotatably supports a set of pinion gears 336. The fourth planetary gearset 312, i.e., the idler planet planetary gearset, can include a fourth sun gear 338, a third ring gear 340, and a third carrier member 342 that rotatably supports two sets of pinion gears 344. One set of pinion gears 372 is rotationally coupled to the sun gear 338 and the other set of pinion gears 374 is rotationally coupled to the ring gear 340.

The transmission 300 is capable of transferring torque from the input shaft 302 to the output shaft 304 in nine forward gears or ratios and one reverse gear or ratio. Each of the forward torque ratios and the reverse torque ratios can be attained by the selective engagement of one or more of the torque-transmitting mechanisms (i.e., torque-transmitting mechanisms 360, 362, 364, 366, 368, and 370). Those skilled in the art will readily understand that a different speed ratio is associated with each torque ratio. Thus, nine forward speed ratios and one reverse speed ratio may be attained by transmission 300. An example of the gear ratios that may be obtained using the embodiments of the present disclosure are also shown in FIG. 6. Of course, other gear ratios are achievable depending on the gear diameter, gear tooth count and gear configuration selected.

As for the transmission 300, kinematic coupling of the first planetary gearset 306 is shown in FIG. 3. The first sun gear 314 is coupled to the input shaft 302 for common rotation therewith. The first ring gear 316 is coupled to the third shaft 350 for common rotation therewith. First pinion gears 320 are configured to intermesh with the first sun gear 314 and first ring gear 316. First carrier member 318 is coupled for common rotation with the first shaft 346 and the second shaft 348.

With respect to the second planetary gearset 308, the second sun gear 322 is coupled to the fourth shaft 352 for common rotation therewith. The second ring gear 324 is coupled to the fifth shaft 354 for common rotation therewith. Second pinion gears 328 are configured to intermesh with the second sun gear 322 and second ring gear 324, and the second carrier member 326 is coupled for common rotation with the third shaft 350 and the first ring gear 316.

The third sun gear 330 of the third planetary gearset 310 is coupled to the fifth shaft 354 as well, and thus is disposed in common rotation with the second ring gear 324. The third ring gear 332 is coupled to the sixth shaft 356 for common rotation therewith. Third pinion gears 336 are configured to intermesh with the third sun gear 330 and third ring gear 332, and the second carrier member 334 is coupled for common rotation with the output shaft 304.

The kinematic relationship of the fourth planetary gearset 312 is such that the fourth sun gear 338 is coupled to the fifth shaft 354 for common rotation therewith, and thus is disposed in common rotation with the third sun gear 330 and the second ring gear 324. The fourth ring gear 340 is coupled to the output shaft 304 for common rotation therewith. Lastly, the fourth pinion gears 344, which include the first set of pinion gears 372 and the second set of pinion gears 374, are configured to intermesh with the fourth sun gear 338 and fourth ring gear 340, respectively. The fourth carrier member 342 is coupled for common rotation with the seventh shaft 358.

With regards to the kinematic coupling of the six torque-transmitting mechanisms to the previously described shafts, the multiple speed transmission 300 of FIG. 3 provides that the first torque-transmitting mechanism 360 is arranged within the power flow between the first shaft 346 and the housing G of the transmission 300. In this manner, the first torque-transmitting mechanism 360 is configured to act as a brake. Similarly, the second torque-transmitting mechanism 362 is arranged within the power flow between the fourth shaft 352 and the housing G of the transmission 300. Thus, similar to the first torque-transmitting mechanism 360, the second torque-transmitting mechanism 362 is configured to act as a brake. The third torque-transmitting mechanism 364 is arranged within the power flow between the sixth shaft 356 and the housing G of the transmission 300. Thus, in this embodiment of the transmission 300 three of the six torque-transmitting mechanism are configured to act as brakes and the other three torque-transmitting mechanisms are configured to act as clutches.

The fourth torque-transmitting mechanism 366 is arranged within the power flow between the input shaft 302 and the first shaft 346. The fifth torque-transmitting mechanism 368 is arranged within the power flow between the second shaft 348 and the fifth shaft 354. Moreover, the sixth torque-transmitting mechanism 370 is arranged within the power flow between the seventh shaft 358 and the output shaft 304.

The kinematic couplings of the embodiment in FIG. 3 can further be described with respect to the selective engagement of the torque-transmitting mechanisms with respect to one or more components of the plurality of planetary gearsets. For example, in the transmission 300, the first torque-transmitting mechanism 360 is selectively engageable to couple the first carrier 318 and the first shaft 346 to the housing G of the transmission 300. The second torque-transmitting mechanism 362 is selectively engageable to couple the second sun gear 322 and the fourth shaft 352 to the housing G of the transmission 300. Moreover, the third torque-transmitting mechanism 364 is selectively engageable to couple the third ring gear 332 and the sixth shaft 356 to the housing G of the transmission 300.

The fourth torque-transmitting mechanism 366 is selectively engageable to couple the input shaft 302 to the first shaft 346 and first carrier member 318. The fifth torque-transmitting mechanism 368 is selectively engageable to couple the first carrier member 318 and the second shaft 348 to the second ring gear 324, third sun gear 330, fourth sun gear 338, and the fifth shaft 348. Lastly, the sixth torque-transmitting mechanism 370 is selectively engageable to couple the fourth carrier member 342 and the seventh shaft 358 to the third carrier member 334 and the output shaft 304.

Figure 4:
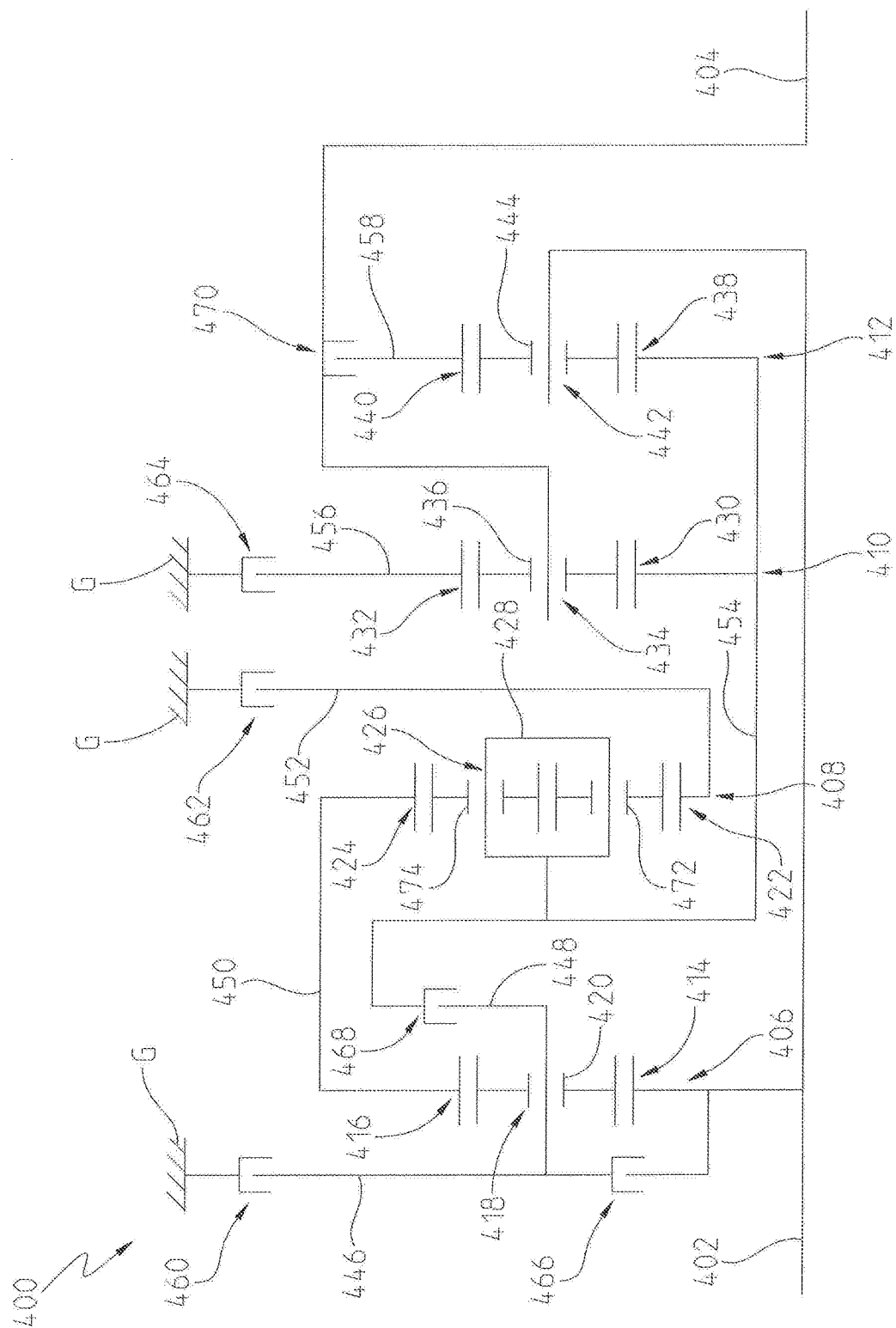
FIG. 4 is a diagrammatic view of a third embodiment of a multiple speed transmission.

In FIG. 4, another embodiment of a multiple speed transmission 400 is shown. The transmission 400 includes an input shaft 402 and an output shaft 404. The input shaft 402 and output shaft 404 can be disposed along the same axis or centerline of the transmission 400. In another aspect, the different shafts can be disposed along different axes or centerlines. In a further aspect, the different shafts can be disposed parallel to one another, but along different axes or centerlines. Other aspect can be appreciated by one skilled in the art.

The transmission 400 can also include a plurality of planetary gearsets. In the illustrated embodiment of FIG. 4, the transmission 400 includes a first planetary gearset 406, a second planetary gearset 408, a third planetary gearset 410, and a fourth planetary gearset 412. The first planetary gearset 406, the third planetary gearset 410, and the fourth planetary gearset 412 can be referred to as a simple or compound planetary gearset. The second planetary gearset 408, however, is an idler planet planetary gearset similar to that shown in FIGS. 2 and 3 and described above. One or more of the plurality of planetary gearsets can be arranged in different locations within the transmission 400, but for sake of simplicity and in this particular example only, the planetary gearsets are aligned in an axial direction consecutively in sequence (i.e., first, second, third, and fourth between the input and output shafts).

The transmission 400 may also include a plurality of torque-transmitting or gearshifting mechanisms. For example, one or more of these mechanisms can include a clutch or brake. In one aspect, each of the plurality of mechanisms is disposed within an outer housing of the transmission 400. In another aspect, however, one or more of the mechanisms may be disposed outside of the housing. Each of the plurality of mechanisms can be coupled to one or more of the plurality of planetary gearsets, which will be described further below.

In the embodiment of FIG. 4, the transmission 400 can include a first torque-transmitting mechanism 460, a second torque-transmitting mechanism 462, and a third torque-transmitting mechanism 464 that are configured to function as brakes (e.g., each torque-transmitting mechanism is fixedly coupled to the outer housing of the transmission 400). These brakes can be configured as shiftable-friction-locked disk brakes, shiftable friction-locked band brakes, shiftable form-locking claw or conical brakes, or any other type of known brake. The transmission 400 can include a fourth torque-transmitting mechanism 466, a fifth torque-transmitting mechanism 468, and a sixth torque-transmitting mechanism 470 that are configured to function as rotating clutches. These can be shiftable friction-locked multi-disk clutches, shiftable form-locking claw or conical clutches, wet clutches, or any other known form of a clutch. With these six torque-transmitting mechanisms, selective shifting of nine forward gears and one reverse gear is possible.

The transmission 400 of FIG. 4 may also include up to nine different shafts, which is inclusive of the input shaft 402 and output shaft 404. Each of these shafts, designated as a first shaft 446, a second shaft 448, a third shaft 450, a fourth shaft 452, a fifth shaft 454, a sixth shaft 456, and a seventh shaft 458 are configured to be connected to one or more of the plurality of planetary gearsets or plurality of torque-transmitting mechanism between the input shaft 402 and output shaft 404.

In FIG. 4, the first planetary gearset 406 can include a first sun gear 414, a first ring gear 416, and a first carrier member 418 that rotatably supports a set of pinion gears 420. The second planetary gearset 408, i.e., the idler planet planetary gearset, can include a second sun gear 422, a second ring gear 424, and a second carrier member 426 that rotatably supports two sets of pinion gears 428. The two sets of pinion gears 428 can include a first set of pinion gears 472 and a second set of pinion gears 474. The number of pinion gears in each set can be any desirable number, but in at least one example the number of pinions in the first set is the same as the number of pinions in the second set.

The third planetary gearset 410 can include a third sun gear 430, a third ring gear 432, and a third carrier member 434 that rotatably supports a set of pinion gears 436. The fourth planetary gearset 412 can include a fourth sun gear 438, a third ring gear 440, and a third carrier member 442 that rotatably supports a set of pinion gears 444.

The transmission 400 is capable of transferring torque from the input shaft 402 to the output shaft 404 in nine forward gears or ratios and one reverse gear or ratio. Each of the forward torque ratios and the reverse torque ratios can be attained by the selective engagement of one or more of the torque-transmitting mechanisms (i.e., torque-transmitting mechanisms 460, 462, 464, 466, 468, and 470). Those skilled in the art will readily understand that a different speed ratio is associated with each torque ratio. Thus, nine forward speed ratios and one reverse speed ratio may be attained by transmission 400. An example of the gear ratios that may be obtained using the embodiments of the present disclosure are also shown in FIG. 6. Of course, other gear ratios are achievable depending on the gear diameter, gear tooth count and gear configuration selected.

As for the transmission 400, kinematic coupling of the first planetary gearset 406 is shown in FIG. 4. The first sun gear 414 is coupled to the input shaft 402 for common rotation therewith. The first ring gear 416 is coupled to the third shaft 450 for common rotation therewith. First pinion gears 420 are configured to intermesh with the first sun gear 414 and first ring gear 416. First carrier member 418 is coupled for common rotation with the first shaft 446 and the second shaft 448.

With respect to the second planetary gearset 408, the second sun gear 422 is coupled to the fourth shaft 452 for common rotation therewith. The second ring gear 424 is coupled to the third shaft 450 for common rotation therewith. Second pinion gears 428, which include the first set of pinion gears 472 and the second set of pinion gears 474, are configured to intermesh with the second sun gear 422 and second ring gear 424, respectively. The second carrier member 426 is coupled for common rotation with the fifth shaft 454.

The third sun gear 430 of the third planetary gearset 410 is coupled to the fifth shaft 454 as well, and thus is disposed in common rotation with the second carrier member 426. The third ring gear 432 is coupled to the sixth shaft 456 for common rotation therewith. Third pinion gears 436 are configured to intermesh with the third sun gear 430 and third ring gear 432, and the second carrier member 434 is coupled for common rotation with the output shaft 404.

The kinematic relationship of the fourth planetary gearset 412 is such that the fourth sun gear 438 is coupled to the fifth shaft 454 for common rotation therewith, and thus is disposed in common rotation with the third sun gear 430 and the second carrier member 426. The fourth ring gear 440 is coupled to the seventh shaft 458 for common rotation therewith. Lastly, the fourth pinion gears 444 are configured to intermesh with the fourth sun gear 438 and fourth ring gear 440. The fourth carrier member 442 is coupled for common rotation with the input shaft 402.

With regards to the kinematic coupling of the six torque-transmitting mechanisms to the previously described shafts, the multiple speed transmission 400 of FIG. 4 provides that the first torque-transmitting mechanism 460 is arranged within the power flow between the first shaft 446 and the housing G of the transmission 400. In this manner, the first torque-transmitting mechanism 460 is configured to act as a brake. Similarly, the second torque-transmitting mechanism 462 is arranged within the power flow between the fourth shaft 452 and the housing G of the transmission 400. Thus, similar to the first torque-transmitting mechanism 460, the second torque-transmitting mechanism 462 is configured to act as a brake. The third torque-transmitting mechanism 464 is arranged within the power flow between the sixth shaft 456 and the housing G of the transmission 400. Thus, in this embodiment of the transmission 400, three of the six torque-transmitting mechanism are configured to act as brakes and the other three torque-transmitting mechanisms are configured to act as clutches.

The fourth torque-transmitting mechanism 466 is arranged within the power flow between the input shaft 402 and the first shaft 446. The fifth torque-transmitting mechanism 468 is arranged within the power flow between the second shaft 448 and the fifth shaft 454. Moreover, the sixth torque-transmitting mechanism 470 is arranged within the power flow between the seventh shaft 458 and the output shaft 404.

The kinematic couplings of the embodiment in FIG. 4 can further be described with respect to the selective engagement of the torque-transmitting mechanisms with respect to one or more components of the plurality of planetary gearsets. For example, in the transmission 400, the first torque-transmitting mechanism 460 is selectively engageable to couple the first carrier 418 and the first shaft 446 to the housing G of the transmission 400. The second torque-transmitting mechanism 462 is selectively engageable to couple the second sun gear 422 and the fourth shaft 452 to the housing G of the transmission 400. Moreover, the third torque-transmitting mechanism 464 is selectively engageable to couple the third ring gear 432 and the sixth shaft 456 to the housing G of the transmission 400.

The fourth torque-transmitting mechanism 466 is selectively engageable to couple the input shaft 402 and the first sun gear 414 to the first shaft 446 and first carrier member 418. The fifth torque-transmitting mechanism 468 is selectively engageable to couple the first carrier member 418 and the second shaft 448 to the second carrier member 426, third sun gear 430, fourth sun gear 438, and the fifth shaft 454. Lastly, the sixth torque-transmitting mechanism 470 is selectively engageable to couple the fourth ring gear 440 and the seventh shaft 458 to the third carrier member 434 and the output shaft 404.

Figure 5:
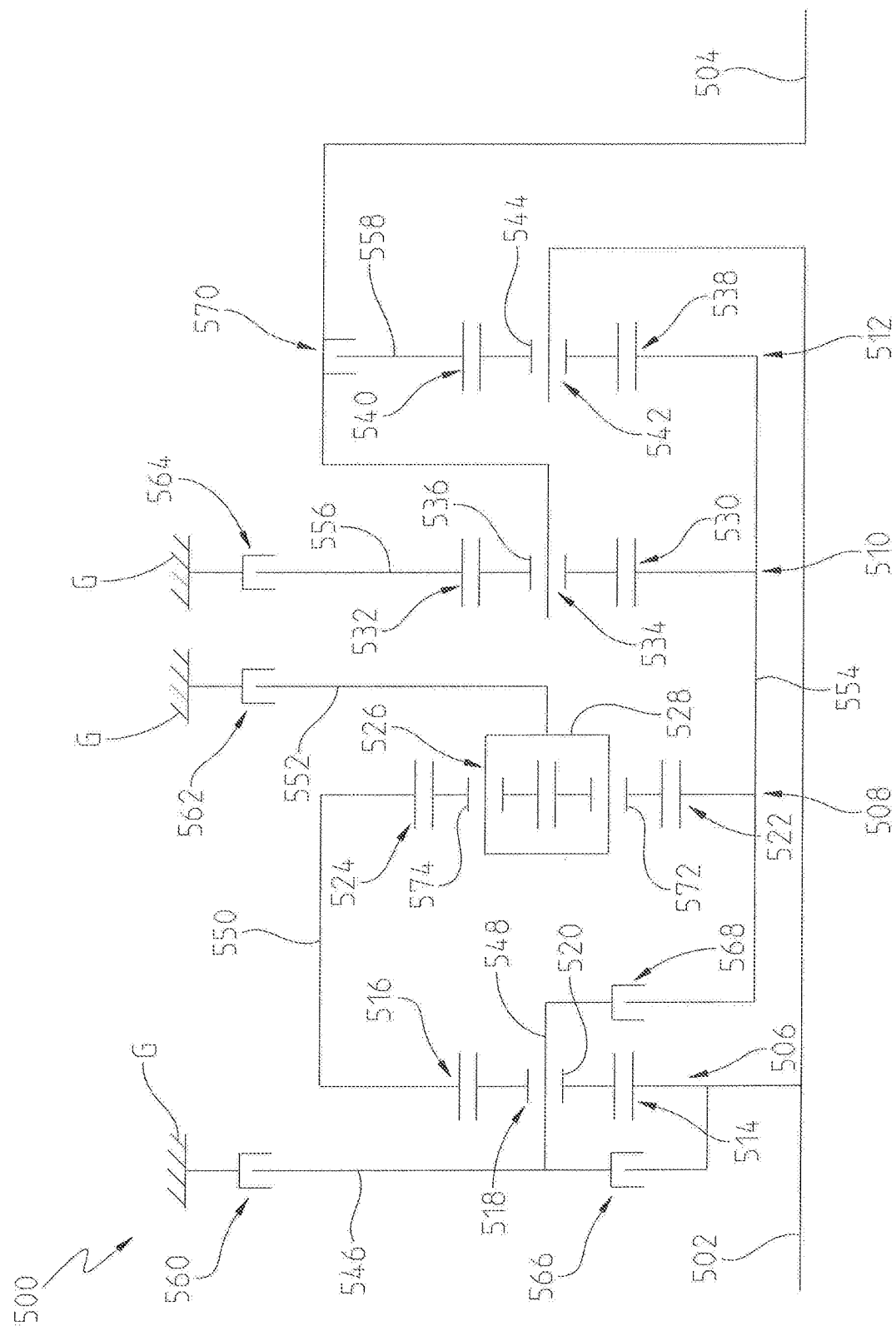
FIG. 5 is a diagrammatic view of a fourth embodiment of a multiple speed transmission.

Referring now to the illustrated embodiment of FIG. 5 is another multiple speed transmission 500 capable of achieving nine forward speeds and one reverse speed. The transmission 500 includes an input shaft 502 and an output shaft 504. The input shaft 502 and output shaft 504 can be disposed along the same axis or centerline of the transmission 500. In another aspect, the different shafts can be disposed along different axes or centerlines. In a further aspect, the different shafts can be disposed parallel to one another, but along different axes or centerlines. Other aspect can be appreciated by one skilled in the art.

The transmission 500 can also include a plurality of planetary gearsets. In the illustrated embodiment of FIG. 5, the transmission 500 includes a first planetary gearset 506, a second planetary gearset 508, a third planetary gearset 510, and a fourth planetary gearset 512. The first planetary gearset 506, the third planetary gearset 510, and the fourth planetary gearset 512 can be referred to as a simple or compound planetary gearset. The second planetary gearset 508, however, is an idler planet planetary gearset similar to that shown in FIG. 4 and described above. One or more of the plurality of planetary gearsets can be arranged in different locations within the transmission 500, but for sake of simplicity and in this particular example only, the planetary gearsets are aligned in an axial direction consecutively in sequence (i.e., first, second, third, and fourth between the input and output shafts).

The transmission 500 may also include a plurality of torque-transmitting or gearshifting mechanisms. For example, one or more of these mechanisms can include a clutch or brake. In one aspect, each of the plurality of mechanisms is disposed within an outer housing of the transmission 500. In another aspect, however, one or more of the mechanisms may be disposed outside of the housing. Each of the plurality of mechanisms can be coupled to one or more of the plurality of planetary gearsets, which will be described further below.

In the embodiment of FIG. 5, the transmission 500 can include a first torque-transmitting mechanism 560, a second torque-transmitting mechanism 562, and a third torque-transmitting mechanism 564 that are configured to function as brakes (e.g., each torque-transmitting mechanism is fixedly coupled to the outer housing of the transmission 500). These brakes can be configured as shiftable-friction-locked disk brakes, shiftable friction-locked band brakes, shiftable form-locking claw or conical brakes, or any other type of known brake. The transmission 500 can include a fourth torque-transmitting mechanism 566, a fifth torque-transmitting mechanism 568, and a sixth torque-transmitting mechanism 570 that are configured to function as rotating clutches. These can be shiftable friction-locked multi-disk clutches, shiftable form-locking claw or conical clutches, wet clutches, or any other known form of a clutch. With these six torque-transmitting mechanisms, selective shifting of nine forward gears and one reverse gear is possible.

The transmission 500 of FIG. 5 may also include up to nine different shafts, which is inclusive of the input shaft 502 and output shaft 504. Each of these shafts, designated as a first shaft 546, a second shaft 548, a third shaft 550, a fourth shaft 552, a fifth shaft 554, a sixth shaft 556, and a seventh shaft 558 are configured to be connected to one or more of the plurality of planetary gearsets or plurality of torque-transmitting mechanism between the input shaft 502 and output shaft 504.

In FIG. 5, the first planetary gearset 506 can include a first sun gear 514, a first ring gear 516, and a first carrier member 518 that rotatably supports a set of pinion gears 520. The second planetary gearset 508, i.e., the idler planet planetary gearset, can include a second sun gear 522, a second ring gear 524, and a second carrier member 526 that rotatably supports two sets of pinion gears 528. The two sets of pinion gears 528 can include a first set of pinion gears 572 and a second set of pinion gears 574. The number of pinion gears in each set can be any desirable number, but in at least one example the number of pinions in the first set is the same as the number of pinions in the second set.

The third planetary gearset 510 can include a third sun gear 530, a third ring gear 532, and a third carrier member 534 that rotatably supports a set of pinion gears 536. The fourth planetary gearset 512 can include a fourth sun gear 538, a third ring gear 540, and a third carrier member 542 that rotatably supports a set of pinion gears 544.

The transmission 500 is capable of transferring torque from the input shaft 502 to the output shaft 504 in nine forward gears or ratios and one reverse gear or ratio. Each of the forward torque ratios and the reverse torque ratios can be attained by the selective engagement of one or more of the torque-transmitting mechanisms (i.e., torque-transmitting mechanisms 560, 562, 564, 566, 568, and 570). Those skilled in the art will readily understand that a different speed ratio is associated with each torque ratio. Thus, nine forward speed ratios and one reverse speed ratio may be attained by transmission 500. An example of the gear ratios that may be obtained using the embodiments of the present disclosure are also shown in FIG. 6. Of course, other gear ratios are achievable depending on the gear diameter, gear tooth count and gear configuration selected.

As for the transmission 500, kinematic coupling of the first planetary gearset 506 is shown in FIG. 5. The first sun gear 514 is coupled to the input shaft 502 for common rotation therewith. The first ring gear 516 is coupled to the third shaft 550 for common rotation therewith. First pinion gears 520 are configured to intermesh with the first sun gear 514 and first ring gear 516. First carrier member 518 is coupled for common rotation with the first shaft 546 and the second shaft 548.

With respect to the second planetary gearset 508, the second sun gear 522 is coupled to the fifth shaft 554 for common rotation therewith. The second ring gear 524 is coupled to the third shaft 550 for common rotation therewith. Second pinion gears 528, which include the first set of pinion gears 572 and the second set of pinion gears 574, are configured to intermesh with the second sun gear 522 and second ring gear 524, respectively. The second carrier member 526 is coupled for common rotation with the fourth shaft 552.

The third sun gear 530 of the third planetary gearset 510 is coupled to the fifth shaft 554 as well, and thus is disposed in common rotation with the second sun gear 522. The third ring gear 532 is coupled to the sixth shaft 556 for common rotation therewith. Third pinion gears 536 are configured to intermesh with the third sun gear 530 and third ring gear 532, and the second carrier member 534 is coupled for common rotation with the output shaft 504.

The kinematic relationship of the fourth planetary gearset 512 is such that the fourth sun gear 538 is coupled to the fifth shaft 554 for common rotation therewith, and thus is disposed in common rotation with the third sun gear 530 and the second sun gear 522. The fourth ring gear 540 is coupled to the seventh shaft 558 for common rotation therewith. Lastly, the fourth pinion gears 544 are configured to intermesh with the fourth sun gear 538 and fourth ring gear 540. The fourth carrier member 542 is coupled for common rotation with the input shaft 502.

With regards to the kinematic coupling of the six torque-transmitting mechanisms to the previously described shafts, the multiple speed transmission 500 of FIG. 5 provides that the first torque-transmitting mechanism 560 is arranged within the power flow between the first shaft 546 and the housing G of the transmission 500. In this manner, the first torque-transmitting mechanism 560 is configured to act as a brake. Similarly, the second torque-transmitting mechanism 562 is arranged within the power flow between the fourth shaft 552 and the housing G of the transmission 500. Thus, similar to the first torque-transmitting mechanism 560, the second torque-transmitting mechanism 562 is configured to act as a brake. The third torque-transmitting mechanism 564 is arranged within the power flow between the sixth shaft 556 and the housing G of the transmission 500. Thus, in this embodiment of the transmission 500, three of the six torque-transmitting mechanism are configured to act as brakes and the other three torque-transmitting mechanisms are configured to act as clutches.

The fourth torque-transmitting mechanism 566 is arranged within the power flow between the input shaft 502 and the first shaft 546. The fifth torque-transmitting mechanism 568 is arranged within the power flow between the second shaft 548 and the fifth shaft 554. Moreover, the sixth torque-transmitting mechanism 570 is arranged within the power flow between the seventh shaft 558 and the output shaft 504.

The kinematic couplings of the embodiment in FIG. 5 can further be described with respect to the selective engagement of the torque-transmitting mechanisms with respect to one or more components of the plurality of planetary gearsets. For example, in the transmission 500, the first torque-transmitting mechanism 560 is selectively engageable to couple the first carrier 518 and the first shaft 546 to the housing G of the transmission 500. The second torque-transmitting mechanism 562 is selectively engageable to couple the second carrier member 526 and the fourth shaft 552 to the housing G of the transmission 500. Moreover, the third torque-transmitting mechanism 564 is selectively engageable to couple the third ring gear 532 and the sixth shaft 556 to the housing G of the transmission 500.

The fourth torque-transmitting mechanism 566 is selectively engageable to couple the input shaft 502 and the first sun gear 514 to the first shaft 546 and first carrier member 518. The fifth torque-transmitting mechanism 568 is selectively engageable to couple the first carrier member 518 and the second shaft 548 to the second sun gear 522, third sun gear 530, fourth sun gear 538, and the fifth shaft 554. Lastly, the sixth torque-transmitting mechanism 570 is selectively engageable to couple the fourth ring gear 540 and the seventh shaft 558 to the third carrier member 534 and the output shaft 504.

One aspect of the aforementioned and illustrated embodiments of FIGS. 2-5 is that each transmission architecture can be kinematically equivalent. In other words, the speed and torque at each node for a given input speed and input torque can be the same for each architecture. A node can be representative of a component within each planetary gearset. For instance, the first sun gear can represent a first node, the first carrier member represents a second node, and the first ring gear represents a third node. This carries forward with each of the second, third, and fourth planetary gearsets so that each of the embodiments can include at least twelve nodes.

As for the kinematic relationship between the different embodiments, for a given input speed and input torque, the speed and torque at each node is substantially equivalent (e.g., within a few RPMs and lb-ft) for each architecture. Thus, there is not a substantial difference between the speed and torque at the first sun gear, for example, regardless of the architectures illustrated in FIGS. 2-5. The only difference therefore is the location of the idler planet planetary gearset within the architecture and the connections thereto.

As also previously described, each of the aforementioned embodiments is capable of transmitting torque from a respective input shaft to a respective output shaft in nine forward torque ratios and one reverse torque ratio. Referring to FIG. 6, one example of a truth table 600 is shown representing a state of engagement of various torque transmitting mechanisms in each of the available forward and reverse speeds or gear ratios of the transmission illustrated in FIGS. 2-5. It is to be understood that FIG. 6 is only one example of any number of truth tables possible for achieving nine forward ratios and one reverse ratio, and one skilled in the art is capable of configuring diameters, gear tooth counts, and gear configurations to achieve other ratios. In FIG. 6, the first torque-transmitting mechanism (C1), the second torque-transmitting mechanism (C2), and the fifth torque-transmitting mechanism (C5) are brakes, whereas the third torque-transmitting mechanism (C3), the fourth torque-transmitting mechanism (C4), and the sixth torque-transmitting mechanism (C6) are clutches. Thus, in the embodiment of FIG. 2, for example, the first torque-transmitting mechanism 260 is a brake and corresponds with C1, the second torque-transmitting mechanism 262 is a brake and corresponds with C2, and the third torque-transmitting mechanism 264 is a brake and corresponds with C5 in FIG. 6. Likewise, the fourth torque-transmitting mechanism 266 is a rotating clutch and corresponds with C3, the fifth torque-transmitting mechanism 268 is a rotating clutch and corresponds with C4, and the sixth torque-transmitting mechanism 270 is a rotating clutch and corresponds with C6 in FIG. 6. The torque-transmitting mechanisms of FIGS. 3-5 correspond with those shown in FIG. 6 in the same manner.

In the example of FIG. 6, the reverse ratio (Rev) can be achieved by the selective engagement of the torque-transmitting mechanisms as set forth in the table. As shown, the first torque transmitting mechanism (C1), second torque-transmitting mechanism (C2), and fifth torque-transmitting mechanism (C5) are selectively engaged to establish the reverse ratio. Thus, in transmission 200 of FIG. 2, the selective engagement of mechanisms 260, 262, and 264 can establish the reverse ratio, whereas in the transmission 300 of FIG. 3 the selective engagement of mechanisms 360, 362, and 364 can establish reverse. As shown, in the reverse ratio, the three brakes are engaged and the three clutches are disengaged.

In neutral (Neu), which is not illustratively shown in FIG. 6, none of the torque-transmitting mechanisms carry torque. One or more of the torque-transmitting mechanisms, however, may be engaged in neutral but not carrying torque. For example, the first and second torque-transmitting mechanisms can be engaged in neutral, thereby resulting in the fifth torque-transmitting mechanism being disengaged between a shift between the reverse ratio and neutral.

A first forward ratio (shown as 1st) in the table of FIG. 6 is achieved by engaging two brakes and one clutch. In FIG. 2, for example, the torque-transmitting mechanisms 262, 268, and 264 are engaged. Thus, as shown in FIG. 6, when transitioning between neutral and the first forward range, C2 and C5 remain selectively engaged while a transition of selectively disengaging C1 and selectively engaging C4 is achieved. Referring to the embodiment of FIG. 2, the second torque-transmitting mechanism 262 and the third torque-transmitting mechanism 264 remain engaged, while the transmission 200 transitions by selectively engaging the fifth torque-transmitting mechanism 268 and selectively disengaging the first torque-transmitting mechanism 260.

In a second or subsequent forward ratio, indicated as 2nd in FIG. 6, C3, C4, and C5 are selectively engaged. Therefore, when transitioning between the first forward ratio and the second forward ratio, C2 is released and C3 is selectively engaged. Referring to the transmission 200 of FIG. 2, the fourth torque-transmitting mechanism 266, fifth torque-transmitting mechanism 268 and third torque-transmitting mechanism 264 are selectively engaged.

In a third or subsequent forward ratio, indicated as 3rd forward ratio in FIG. 6, C2, C3, and C5 are engaged. To transition from the second forward ratio to the third forward ratio, for example, C2 is selectively engaged and C4 is released. Referring to FIG. 2, for example, the second torque-transmitting mechanism 262, the fifth torque-transmitting mechanism 266, and the third torque-transmitting mechanism 264 are selectively engaged.

In a fourth or the next subsequent forward ratio, indicated as 4th in FIG. 6, C2, C5, and C6 are engaged. Thus, to transition from the third forward ratio and upshift to the fourth forward ratio, C6 is selectively engaged and C3 is released. Referring to the illustrated embodiment of FIG. 2, in the fourth forward ratio the second torque-transmitting mechanism 262, the third torque-transmitting mechanism 264, and the sixth torque-transmitting mechanism 270 are selectively engaged.

In a fifth or the next subsequent forward ratio, indicated as 5th in FIG. 6, C2, C3, and C6 are engaged. Thus, to transition from the fourth forward ratio and upshift to the fifth forward ratio, C3 is selectively engaged and C5 is released. As it related to the transmission 200 in FIG. 2, the second torque-transmitting mechanism 262, the fourth torque-transmitting mechanism 266, and the sixth torque-transmitting mechanism 270 are selectively engaged in the fifth forward ratio in accordance with the example of FIG. 6.

In a sixth or the next subsequent forward ratio, indicated as 6th in FIG. 6, C3, C4, and C6 are engaged. Thus, to transition from the fifth forward ratio and upshift to the sixth forward ratio, C4 is selectively engaged and C2 is released. In regards to FIG. 2, the fourth torque-transmitting mechanism 266, the fifth torque-transmitting mechanism 268, and the sixth torque-transmitting mechanism 270 of the transmission 200 are selectively engaged in this forward ratio.

In a seventh or the next subsequent forward ratio, indicated as 7th in FIG. 6, C2, C4, and C6 are engaged. Thus, to transition from the sixth forward ratio and upshift to the seventh forward ratio, C2 is selectively engaged and C3 is disengaged. Referring to FIG. 2, in the seventh forward range according to the truth table of FIG. 6, the second torque-transmitting mechanism 262 is selectively engaged along with the fifth torque-transmitting mechanism 268 and the sixth torque-transmitting mechanism 270. During the transition, the fourth torque-transmitting mechanism 266 is selectively disengaged to achieve the seventh forward ratio.

In an eighth or the next subsequent forward ratio, indicated as 8th in FIG. 6, C1, C4, and C6 are engaged. Thus, to transition from the seventh forward ratio and upshift to the eighth forward ratio, C1 is selectively engaged and C2 is disengaged. As it relates to the embodiment of FIG. 2, and similarly to the embodiments of FIGS. 3-5, the first torque-transmitting mechanism 260, the fifth torque-transmitting mechanism 268, and the sixth torque-transmitting mechanism 270 are selectively engaged.

In a ninth or the next subsequent forward ratio, referred to as 9$^{th}$ in FIG. 6, C1, C2, and C6 are engaged. To transition therefore from the eighth forward ratio and upshift to the ninth forward ratio, C2 is selectively engaged and C4 is released. Referring to FIG. 2, the second torque-transmitting mechanism 262 is selectively engaged and the fifth torque-transmitting mechanism 268 is released, and thus in the ninth forward ratio the first torque-transmitting mechanism 260, the second torque-transmitting mechanism 262, and the sixth torque-transmitting mechanism 270 are selectively engaged.

As previously described, the truth table 600 of FIG. 6 can be applicable to the shift transitions of the embodiments in FIGS. 3-5. In this manner, the four illustrated embodiments in FIGS. 2-6 can provide for kinematically equivalent architectures that further include at least three simple planetary gearsets, at least one idler planet planetary gearset, six torque-transmitting mechanisms, and single transition shifts to achieve nine forward ratios and one reverse ratio.

The present disclosure contemplates that downshifts follow the reverse sequence of the corresponding upshift (as described above) in FIG. 6, and several power-on skip-shifts that are single-transition are possible (e.g. from 1st to 3rd or 3rd to 1st) in related embodiments.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input member;
an output member;
first, second, third and fourth planetary gearsets each having first, second and third members;
a plurality of interconnecting members each connected between at least one of the first, second, third, and fourth planetary gearsets and at least another of the first, second, third, and fourth planetary gearsets;
a first torque-transmitting mechanism selectively engageable to interconnect the second member of the first planetary gearset with a stationary member;
a second torque-transmitting mechanism selectively engageable to interconnect the first member of the second planetary gearset with the stationary member;
a third torque-transmitting mechanism selectively engageable to interconnect the third member of the third planetary gearset with the stationary member;
a fourth torque-transmitting mechanism selectively engageable to interconnect the second member of the first planetary gearset with the first member of the first planetary gearset and the input member;
a fifth torque-transmitting mechanism selectively engageable to interconnect the second member of the first planetary gearset with the second member of the second planetary gearset, the first member of the third planetary gearset, and the first member of the fourth planetary gearset; and
a sixth torque-transmitting mechanism selectively engageable to interconnect the third member of the fourth planetary gearset with the second member of the third planetary gearset and the output member;
wherein the torque transmitting mechanisms are selectively engageable in combinations of three to establish nine forward speed ratios and one reverse speed ratio between the input member and the output member;
wherein, there are no more than six torque-transmitting mechanisms;
wherein one of the first, second, third and fourth planetary gearsets comprises an idler planet planetary gearset.

2. The multiple speed transmission of claim 1, wherein the second planetary gearset comprises the idler planet planetary gearset.

3. The multiple speed transmission of claim 1, wherein the second member of the third planetary gearset is continuously interconnected with the output member.

4. The multiple speed transmission of claim 1, wherein the input member is continuously interconnected with the first member of the first planetary gearset and the second member of the fourth planetary gearset.

5. The multiple speed transmission of claim 1, wherein the plurality of interconnecting members includes a first interconnecting member continuously interconnecting the third member of the first planetary gearset with the third member of the second planetary gearset.

6. The multiple speed transmission of claim 1, wherein the plurality of interconnecting members includes a second interconnecting member continuously interconnecting the second member of the second planetary gearset with the first member of the third planetary gearset and the first member of the fourth planetary gearset.

7. The multiple speed transmission of claim 1, wherein the first, second, and third members of the first, second, third, and fourth planetary gearsets are each at least one of a sun gear, a ring gear, and a carrier member.

8. The multiple speed transmission of claim 1, wherein when shifting from a forward gear to one of a successive higher and a successive lower forward gar, a single engaged one of the first, the second, the third, the fourth, the fifth, and the sixth torque-transmitting mechanisms is disengaged and a single disengaged one of the first, the second, the third, the fourth, the fifth, and the sixth torque-transmitting mechanisms is engaged.

9. A multiple speed transmission, comprising:
an input member;
an output member;
first, second, third and fourth planetary gearsets each having a sun gear, a carrier member, and a ring gear;
a plurality of interconnecting members each connected between at least one of the first, second, third, and fourth planetary gearsets and at least another of the first, second, third, and fourth planetary gearsets;
a first torque-transmitting mechanism selectively engageable to interconnect the carrier member of the first planetary gearset with a stationary member;
a second torque-transmitting mechanism selectively engageable to interconnect the sun gear of the second planetary gearset with the stationary member;
a third torque-transmitting mechanism selectively engageable to interconnect the ring gear of the third planetary gearset with the stationary member;
a fourth torque-transmitting mechanism selectively engageable to interconnect the carrier member of the first planetary gearset with the sun gear of the first planetary gearset and the input member;
a fifth torque-transmitting, mechanism selectively engageable to interconnect the carrier member of the first planetary gearset with the carrier member of the second planetary gearset, the sun gear of the third planetary gearset, and the sun gear of the fourth planetary gearset; and
a sixth torque-transmitting mechanism selectively engageable to interconnect the ring gear of the fourth planetary gearset with the carrier member, of the third planetary gearset and the output member;
wherein the torque transmitting mechanisms are selectively engageable in combinations of at least three to establish at least nine forward speed ratios and at least one reverse speed ratio between the input member and the output member.

10. The multiple speed transmission of claim 9, wherein the second planetary gearset comprises an idler planet planetary gearset.

11. The multiple speed transmission of claim 9, wherein the carrier member of the third planetary gearset is continuously interconnected with the output member.

12. The multiple speed transmission of claim 9, wherein the input member is continuously interconnected with the sun gear of the first planetary gearset and the carrier member of the fourth planetary gearset.

13. The multiple speed transmission of claim 9, wherein the plurality of interconnecting members includes an interconnecting member continuously interconnecting the ring gear of the first planetary gearset with the ring gear of the second planetary gearset.

14. The multiple speed transmission of claim 9, wherein the plurality of interconnecting members includes an interconnecting member continuously interconnecting the carrier member of the second planetary gearset with the sun gear of the third planetary gearset and the sun gear of the fourth planetary gearset.

15. The multiple speed transmission of claim 9, wherein the carrier member of the first planetary gearset is selectively connected to three of the four sun gears.

16. The multiple speed transmission of claim 9, wherein the plurality of interconnecting members includes an interconnecting member directly connected to the second gear.

17. The multiple speed transmission of claim 9, wherein the plurality of interconnecting members includes an interconnecting member directly connected to the third ring gear.

18. The multiple speed transmission of claim 9, wherein the plurality of interconnecting members includes an interconnecting member directly connected to the fourth ring gear.

19. The multiple speed transmission of claim 9, wherein the plurality of interconnecting members includes an interconnecting member directly connected to the first carrier member.

20. A multiple speed transmission, comprising:
an input member;
an output member;
first, second, third and fourth planetary gearsets each having a sun gear, a carrier member, and a ring gear;
a plurality of interconnecting members each connected between at least one of the first, second, third, and fourth planetary gearsets and at least another of the first, second, third, and fourth planetary gearsets;
a first torque-transmitting mechanism selectively engageable to interconnect the carrier member of the first planetary gearset with a stationary member;
a second torque-transmitting mechanism selectively engageable to interconnect the sun gear of the second planetary gearset with the stationary member;
a third torque-transmitting mechanism selectively engageable to interconnect the ring gear of the third planetary gearset with the stationary member;
a fourth torque-transmitting mechanism selectively engageable to interconnect the carrier member of the first planetary grand with the sun gear of the first planetary gearset and the input member;
a fifth torque-transmitting mechanism selectively engageable to interconnect the carrier member of the first planetary gearset with the carrier member of the second planetary gearset, the sun gear of the third planetary gearset, and the atm gear of the fourth planetary gearset;
a sixth torque-transmitting mechanism selectively engageable to interconnect the ring gear of the fourth planetary gearset with the carrier member of the third planetary gearset and the output member;
a first interconnecting member of the plurality of interconnecting members continuously interconnecting the ring gear of the first planetary gearset with the ring gear of the second planetary gearset;
a second interconnecting member of the plurality of interconnecting members continuously interconnecting the carrier member of the second planetary gearset with the sun gear of the third planetary gearset and the sun gear of the fourth planetary gearset;
a third interconnecting member of the plurality of interconnecting members directly connected to the second sun gear;
a fourth interconnecting member of the plurality of interconnecting members directly connected to the third ring gear;
a fifth interconnecting member of the plurality of interconnecting members directly connected to the fourth ring gear; and
a sixth interconnecting member of the plurality of interconnecting members directly connected to the first carrier member;
wherein the torque transmitting mechanisms are selectively engageable in combinations of three to establish nine forward speed ratios and a reverse speed ratio between the input member and the output member.

* * * * *